July 11, 1933. F. SCHLAGINTWEIT 1,917,738
APPARATUS FOR MOLDING CONCRETE AND LIKE PLASTIC SUBSTANCES
Filed May 10, 1932   2 Sheets-Sheet 1
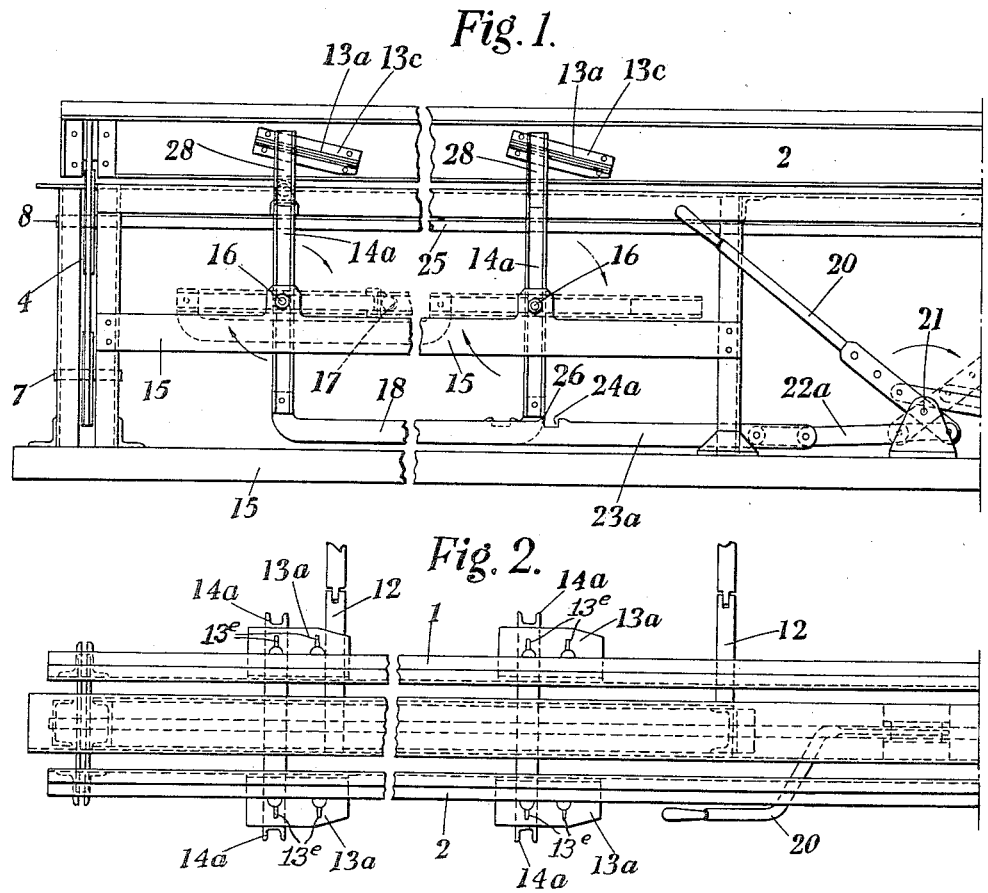
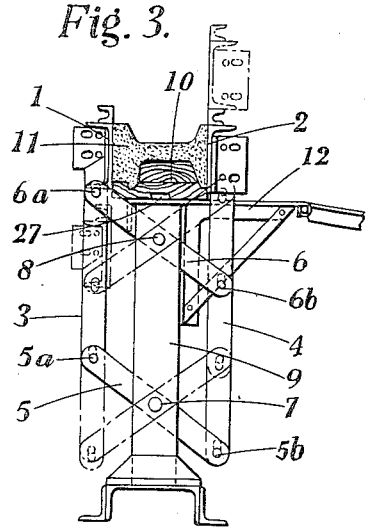
INVENTOR
F. SCHLAGINTWEIT
BY
ATTORNEY July 11, 1933. F. SCHLAGINTWEIT 1,917,738
APPARATUS FOR MOLDING CONCRETE AND LIKE PLASTIC SUBSTANCES
Filed May 10, 1932 2 Sheets-Sheet 2
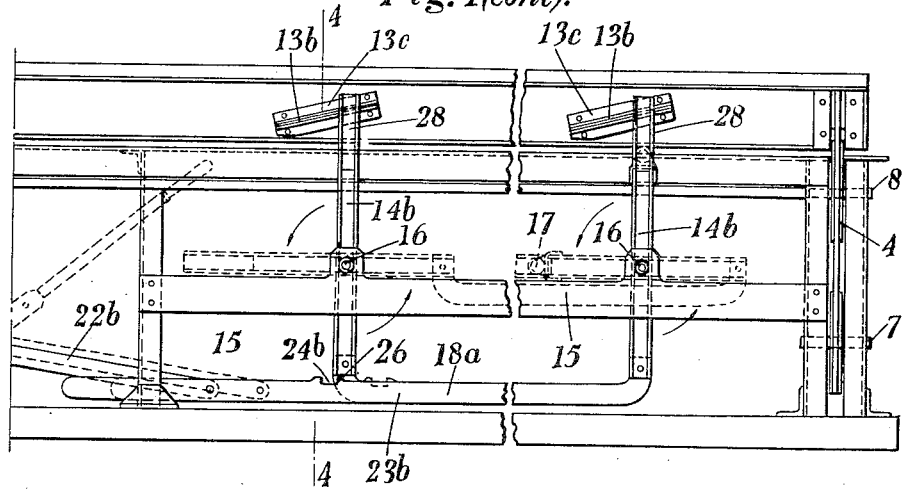
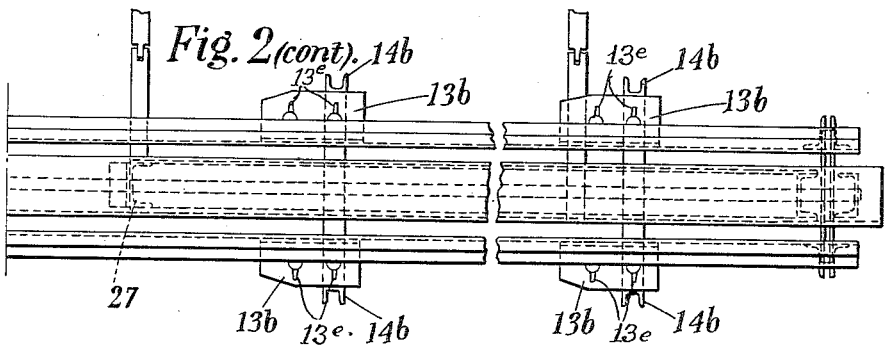
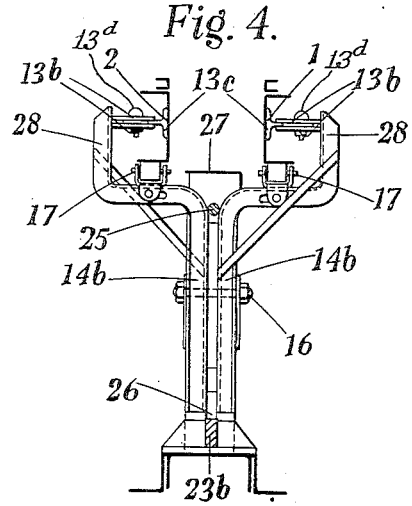
INVENTOR
F. SCHLAGINTWEIT
BY
ATTORNEY Patented July 11, 1933

1,917,738

UNITED STATES PATENT OFFICE

FRIEDRICH SCHLAGINTWEIT, OF BADEN-BADEN, GERMANY

APPARATUS FOR MOLDING CONCRETE AND LIKE PLASTIC SUBSTANCES

Application filed May 10, 1932, Serial No. 610,431, and in Great Britain July 7, 1931.

This invention relates to apparatus for molding concrete and like plastic materials and more particularly to apparatus for the manufacture of reinforced concrete beams, in which the two side walls of the mold in their working position are pressed against the bottom of the mold by means of a number of cam or like devices arranged along the length of the mold, and after the loosening of these cams the walls can be swung apart upwards or downwards. In a known molding apparatus of this type the side walls of the mold when in the working position are held firmly against the bottom of the mold in the vertical direction solely by the friction produced by means of the cams. This friction does not, however, suffice to prevent with absolute certainty any vertical displacement of the side walls of the mold when the concrete is being rammed in. By a vertical displacement of this kind, moreover, the mold becomes distorted, so that in certain circumstances the molded work is rendered useless.

In the improved apparatus in accordance with the present invention the cam or like devices for closing the side walls of the mold against the bottom thereof are actuated by a plurality of levers which in operative position also support the side walls in correct vertical relation to the bottom of the mold.

Another feature of the improved machine resides in the fact that the cam or like devices arranged along the length of the mold for closing the side walls of the mold against the bottom thereof are acted upon by a plurality of levers operated from a common actuating member.

Each lever is preferably constituted in the form of a fork at the upper end which embraces the two side walls of the mold, while the prongs of the fork serve as abutments for the cams carried by the side walls of the molds or are themselves provided with cam faces. To enable the walls of the mold for the construction of girders of different dimensions to be placed at different distances apart, the cams are, according to the invention, adjustable transversely in relation to the side walls of the mold. Simultaneously with the change in the position of the cams the bottom of the mold must, of course, also be changed.

In order that on the tightening or loosening of the cams no longitudinal displacement of the side walls of the mold due to the forces thereby set up may occur, the cam faces are, according to the invention, inclined partly in one direction, partly in the other direction, in relation to the side walls of the mold. Similarly, the rocking levers are swung by groups in opposite directions.

In this type of machine, the mold walls must be capable of being moved jointly a slight distance before the mold walls can be stripped from the work. Until this common descending movement of the mold walls is completed, the rocking levers must continue to act as supporting members for the side walls of the mold, i. e. they must be positively controlled. This is permitted by the common actuating means hereinafter described in detail.

The invention is intended to be used particularly with a molding device in which the side walls of the mold are flexibly connected, in known manner, at each end of the device, to a parallel motion linkage so that one side wall moves upwards and the other downwards. Here, in order to ensure that the side walls of the mold be kept exactly parallel when being withdrawn from the molded work, at least one lever of the linkage at one end of the machine is rigidly connected with the corresponding link at the other end by means of a rod which serves as a pivot.

In the accompanying drawings which illustrate diagrammatically one embodiment of the invention Figs. 1 and 2 show the mold arrangements with the side walls in the working position, in side view and in plan respectively.

Fig. 3 is an end elevation of the arrangement to enlarged scale.

Fig. 4 is a section to enlarged scale on the line 4—4 of Fig. 1.

The two side walls 1 and 2 of the mold which are constructed in the form of channel sections are provided at their ends with vertical supports 3 and 4, directed downwards. Each two supports placed on the same end of the device are flexibly connected with two links 5 and 6 by means of pivots 5a and 5b, 6a and 6b, these links being connected by means of pivots 7 and 8 by a vertical support 9 of the framework of the device and forming a parallel motion linkage. The pins 5a, 5b and 6a, 6b which are accommodated in holes of the supports 3 and 4 are allowed play in the vertical direction, so that the two supports can be raised or lowered conjointly with the mold walls 1 and 2, to a slight extent. The mold bottom 10, which is preferably composed of several timber sections, rests together with the molded work 11 on a number of horizontal rails 27 carried by the framework. In order to withdraw the work after molding, the side pressure on the side walls of the mold is removed, and these walls are swung apart, the wall 2 moving upwards and the wall 1 downwards, into the positions indicated by the dotted lines in Fig. 3, whereupon the mold bottom 10 together with the work 11 can be pushed out of the mold on to side supports 12.

For pressing the side walls 1 and 2 of the mold, against the bottom 10 of the mold and for holding the walls in position during molding, each of the side walls carries cams 13a and 13b and a corresponding number of rocking levers 14a and 14b co-operating with these cams. The rocking levers 14a and 14b are positioned in the framework 15 on pivots 16, and their upper ends are constructed in the form of forks 28, which embrace the two side walls 1 and 2 of the mold. These forks serve as abutments for the cams 13a and 13b. The faces of the cams 13a arranged on each side of the mold are inclined in relation to the mold wall in one direction, while the faces of the other two cams 13b are inclined in the opposite direction. Accordingly the levers 14a and 14b must also be swung in opposite directions by means to be described in more detail later on. The cams 13a and 13b are, moreover, arranged obliquely to the horizontal plane passing through the side walls of the mold. Each cam preferably consists of two parts, one of which (13c) is fixed to the mold wall in question, while the other (13a or 13b) is adjustable transversely to the mold wall and can be locked in different positions by bolts 13d operating in slotted holes 13e to provide for variations in the width of the mold. In the example illustrated the portion 13c consists of a bar of T-section and the adjustable parts 13a or 13b consist of pairs of plates adjustably secured thereto.

In the forked end of each of the rocking levers 14a and 14b are positioned two rollers 17, which serve as supporting members for the side walls 1 and 2 of the mold and hold them in exact vertical relation to the bottom during the molding operation.

When the rocking levers are moved to locking position as shown in full lines in Fig. 1 the rollers 17 lift the side walls 1, 2 slightly, the slotted holes in the supports 3, 4 permitting this movement. Each two rocking levers 14a, 14a and 14b, 14b are connected at their lower ends by a horizontal link-rod 18 and 18a, so that the levers are parallel to each other at any angle of adjustment.

Approximately in the centre of the framework a hand lever 20 is positioned so that it can swing about a pivot 21. This hand lever 20, by means of two push links 22a and 22b acting on both sides of its pivot-pin, is connected with two horizontal slides 23a and 23b positioned in the lower part of the framework, so that by swinging the hand lever these slides 23a and 23b are displaced in opposite directions. Each slide is provided with an upper recess 24a, 24b into which passes a projecting lip 26 carried between the lower ends of a rocking lever 14a and 14b. By the arrangement of the rocking levers 14a and 14b in the recesses 24a and 24b the said levers on the reciprocal movement of the slides 23a and 23b are also actuated by these latter. The levers are moved by these slides only over a certain distance, which suffices to bring into or place out of operation the cam devices and previously to raise and subsequently to lower the side walls 1 and 2 of the mold conjointly to a slight extent by means of the rollers 17 in the manner above described. When the levers have been moved to release the pressure on the side walls, the lips 26 can be lifted out of the recesses 24a, 25b by the descending mold wall 1 as it moves to the position shown in dotted lines in Fig. 3. When the mold walls 1 and 2 are swung up again to the same level, the lips 26 drop back into the recesses 24a and 24b.

A rod 25 extends over the entire length of the machine and is fixed at each end to the links 6 and the projecting ends 8 of this rod 25 form the pivots for the links 6, and thus ensures that the two mold walls 1 and 2 are kept exactly parallel.

I claim:—

1. Apparatus for molding concrete articles of the character designated comprising in combination a mold having side walls movable in relation to the bottom, cam devices for closing said side walls against the bottom of the mold, levers engaging said cam devices, said levers also supporting the side walls in correct vertical relation to the bottom of the mold.

2. Apparatus for molding concrete articles of the character designated comprising in combination a mold having side walls movable in relation to the bottom, means for adjusting said cam devices transversely in relation to the side walls to provide for beams of varying width, levers engaging said cam devices, said levers also supporting the side walls in correct vertical relation to the bottom of the mold.

3. Apparatus for molding concrete articles of the character designated comprising in combination a mold having side walls movable in relation to the bottom, cam devices for closing said side walls against the bottom of the mold, levers engaging said cam devices, said levers being forked at their upper ends and carrying supporting rollers for the side walls of the mold.

4. Apparatus for molding concrete articles of the character designated comprising in combination a mold having side walls movable in relation to the bottom, cam devices arranged along the length of the mold for closing said side walls against the bottom of the mold, the cam devices at one end of the machine being inclined in the opposite direction to those at the other end of the machine, and levers for engaging said cam devices operated from a common member.

5. Apparatus for molding concrete articles of the character designated comprising in combination a mold having side walls movable in relation to the bottom, cam devices, levers engaging said cam devices supporting the side walls in correct vertical relation to the bottom of the mold and operated from a common actuating member, said actuating member driving in opposite directions two slides each of which is recessed to engage said levers in such a manner that the levers are released from the slide after the loosening of the cam devices.

6. Apparatus for molding concrete articles of the character designated comprising in combination a mold having side walls movable in relation to the bottom, means for pressing said side walls against the bottom of the mold, and means for allowing said side walls to move in the same direction after the pressure is released and then causing said side walls to move in opposite directions.

7. Apparatus for molding concrete articles of the character designated comprising in combination a mold having side walls movable in relation to the bottom, cam devices, levers engaging said cam devices supporting the side walls in correct vertical relation to the bottom of the mold, said levers being forked at their upper ends and carrying rollers for supporting the side walls of the mold, and being operated from a common actuating member, said actuating member driving in opposite directions two slides each of which is recessed to engage said levers in such a manner that the levers are released from the slide after the loosening of the cam devices.

8. Apparatus for molding concrete articles of the character designated comprising in combination a mold having side walls movable in relation to the bottom, said side walls being provided at each end of the machine with a parallel motion linkage permitting one wall to move upwards and the other wall downwards, said linkages being interconnected by a rod passing through the machine and carrying at each end a pivot of the linkage.

9. Apparatus for molding concrete articles of the character designated comprising in combination a mold having side walls movable in relation to the bottom, means for connecting the side walls, said means allowing a small downward movement of both the side walls on release of the pressure from their sides, to free them from the work and causing one wall subsequently to move upward and the other wall downward.

10. Apparatus for molding concrete articles of the character designated comprising in combination a mold having side walls movable in relation to the bottom, cam devices arranged at intervals along the length of the mold for closing said walls against the bottom of the mold, a plurality of levers each acting upon one of said cam devices, link rods connecting the levers on each end with each other, a hand lever placed approximately centrally along the length of the side walls and connecting links causing movement to be transferred from said hand lever to said cam actuating levers, whereby the actuating levers on one end of the machine are caused to swing in one direction and the other end levers are caused to swing in the opposite direction to effect closure of the side walls of the mold.

11. Apparatus for molding concrete articles of the character designated comprising in combination a mold having side walls movable in relation to the bottom, cam devices arranged at intervals along the length of the mold for closing said walls against the bottom of the mold, a plurality of levers each acting upon one of said cam devices, projecting lips on said cam actuating levers, a hand lever, a horizontal slide operated by said hand lever, said horizontal slide being provided with recesses adapted to engage the lips on said actuating levers.

In testimony whereof I affix my signature.

FRIEDRICH SCHLAGINTWEIT.